United States Patent
Proietty et al.

(10) Patent No.: US 10,594,241 B1
(45) Date of Patent: Mar. 17, 2020

(54) ROTOR POSITION MEASUREMENT AND CONTROL

(71) Applicant: Ford Global Technologies, LLC, Dearborn, MI (US)

(72) Inventors: John Proietty, Ferndale, MI (US); Susan Rebecca Cikanek, Northville, MI (US); Bader M. Badreddine, Dearborn Heights, MI (US); William Reynolds, Tecumseh (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/190,990

(22) Filed: Nov. 14, 2018

(51) Int. Cl.
| | |
|---|---|
| H02P 6/12 | (2006.01) |
| H02P 21/18 | (2016.01) |
| F25B 49/02 | (2006.01) |
| H02P 21/22 | (2016.01) |
| H02P 6/21 | (2016.01) |
| B60H 1/00 | (2006.01) |

(52) U.S. Cl.
CPC ............ H02P 21/18 (2016.02); F25B 49/025 (2013.01); B60H 1/00428 (2013.01); F25B 2700/171 (2013.01); H02P 6/12 (2013.01); H02P 6/21 (2016.02); H02P 21/22 (2016.02)

(58) Field of Classification Search
CPC ......... H02P 6/08; H02P 6/085; H02P 2207/01
See application file for complete search history.

(56) References Cited

U.S. PATENT DOCUMENTS

| | | | |
|---|---|---|---|
| 7,999,496 B2 * | 8/2011 | Gleason | B60K 6/365 318/139 |
| 8,174,220 B2 | 5/2012 | Inoue et al. | |
| 9,612,997 B1 * | 4/2017 | Petrucci | G06F 15/80 |
| 9,634,593 B2 | 4/2017 | Marcinkiewicz et al. | |
| 2010/0088441 A1 * | 4/2010 | Peterson | B60L 1/003 710/110 |

* cited by examiner

*Primary Examiner* — Rina I Duda
(74) *Attorney, Agent, or Firm* — David Kelley; Brooks Kushman P.C.

(57) ABSTRACT

A vehicle includes a controller configured to deactivate an inverter driving the rotor. The deactivation being responsive to respective speeds for a rotor derived from respective samples from each of a monitoring core and a current control core over a same temporal window being different by a threshold amount. The cores each generate a different number of the samples due to having different chronometric periods and the temporal window being greater than the chronometric periods.

11 Claims, 4 Drawing Sheets

ROTOR POSITION MEASUREMENT AND CONTROL

TECHNICAL FIELD

This disclosure relates to rotor position measurement and control.

BACKGROUND

Electric machines may include sensors to monitor rotor position and speed. The sensors may be converted to digital signals through analog-to-digital conversion (ADC). Processing cores may run control algorithms to interpret the digital signals and further control the electric machine rotor. The control algorithms may be bifurcated, trifurcated, or divided to various processing cores to improve control of the electric machine. The chronometric period of the cores may impose limitations on monitoring the algorithm output.

SUMMARY

A vehicle includes a controller configured to deactivate an inverter driving the rotor. The deactivation being responsive to respective speeds for a rotor derived from respective samples from each of a monitoring core and a current control core over a same temporal window being different by a threshold amount. The cores each generate a different number of the samples due to having different chronometric periods and the temporal window being greater than the chronometric periods.

A method includes generating, by monitoring and torque control cores, respective samples indicating respective speeds of a rotor over a same temporal window. The method includes deactivating, by a controller, an inverter driving the rotor responsive to the speeds being different by a threshold amount. The cores each generate a different number of the samples over the temporal window due to having different chronometric periods and the temporal window being greater than the chronometric periods.

A vehicle includes a controller configured to shut down an inverter associated with a rotor, wherein a monitoring window is based on chronometric periods of a monitoring core and a torque control core and wherein a current control window is based on a chronometric period of a current control core. The shutdown is responsive to a rotor speed indication of the monitoring core over the monitoring window deviating from one of a rotor speed indication of the torque control core over the monitoring window or a rotor speed indication of the current control core over the current control window.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A controller may be designated to control an electric machine and other devices as part of a greater control scheme. Processing cores within the controller may be used to monitor and control the electric machine. The cores may be part of a unitary chip. The cores may be purposed to determine torque and current requirements. The cores may be purposed to control the torque and current of the electric machine or compute the necessary torque and current. An additional monitoring core may be configured to monitor the torque control core and the current control core. The cores may have dissimilar chronometric periods. For example, the monitoring core may have a longer chronometric period (10 ms) to enable lock-step validation capabilities. The current control core may run with the shortest chronometric period (1 µs). Chronometric periods may be the period between clock cycles or the inverse of the frequency of the core. Validation of proper core behavior based on sensory input requires cooperative measurement windows to ensure data validity. For example, the cores may have time modules configured to provide resolver or sensor data from a digital converter at a particular frequency. The cores then independently process the sensor data. The monitoring core may ensure that each of the other cores is processing properly by verifying the sensor data. If there is a mismatch, the monitoring core may shut down the inverter. The cores may access sensor data differently, causing false positives during data validation. A fault-tolerant time window may be configured to reduce these false positives.

Figure 1:
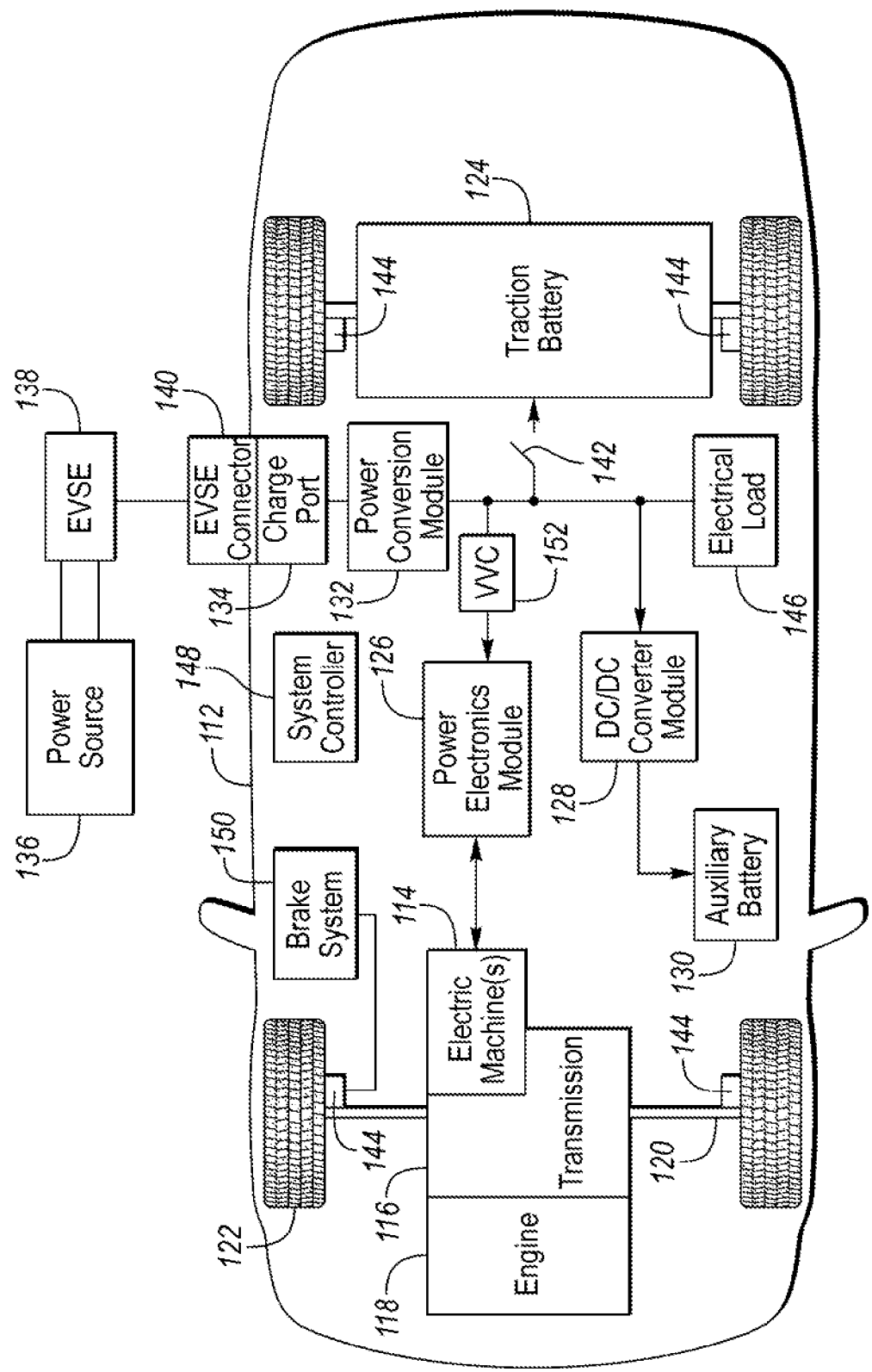
FIG. 1 is an overview of a vehicle having an electric machine.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A traction battery or battery pack 124 stores energy that can be used by the electric machines 114. The vehicle battery pack 124 may provide a high voltage direct current (DC) output. The traction battery 124 may be electrically coupled to one or more power electronics modules 126. One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may include an inverter to convert the DC voltage to a three-phase AC current to operate the electric machines 114. In a regenerative mode, the inverter of the power electronics module 126 may convert the three-phase AC current from the electric machines 114 acting as generators to the DC voltage compatible with the traction battery 124.

The vehicle 112 may include a variable-voltage converter (VVC) 152 electrically coupled between the traction battery 124 and the power electronics module 126. The VVC 152 may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Figure 2:
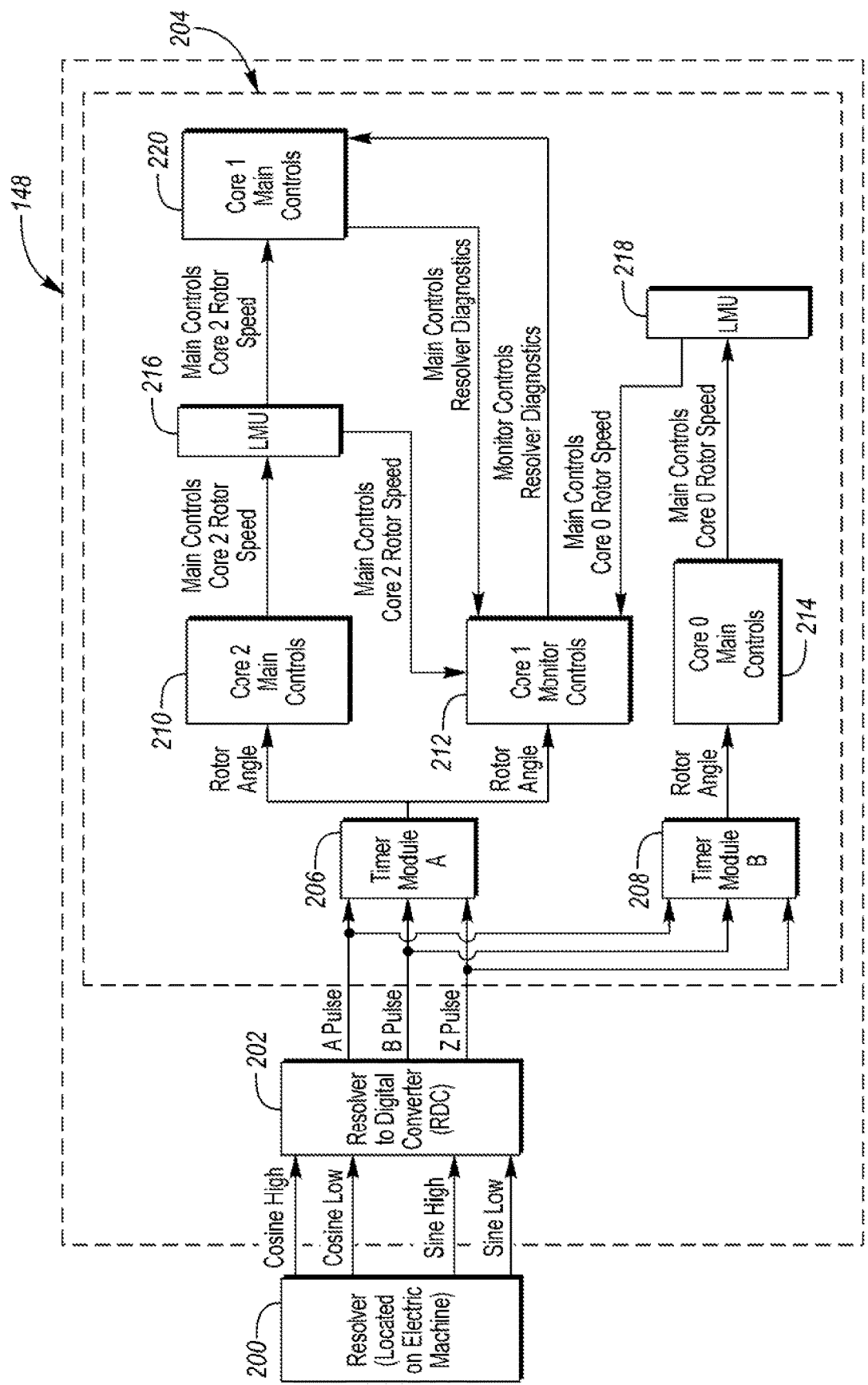
FIG. 2 is a functional schematic view of a controller of a vehicle.

Referring to FIG. 2, a VSC 148 is shown. At least one function of the VSC 148 may be to determine torque and current commands for the electric machine 114 that are provided via the inverter of power electronics module 126. Those commands may be based on a resolver or sensor on the electric machine. A resolver or sensor 200 provides analog input of rotor position within electric machine 114 in the form of high and low, cosine and sine signals. The signals are converted to digital indications by the analog-to-digital converter 202. The analog-to-digital converter creates a quadrature set of digital signals (e.g., A, B) and an index signal (e.g., Z) for a completed rotation. Single-ended or differential wiring may be used to connect the digital signals to the timer modules 206, 208. The timer modules 206, 208 within the multicore processor 204 provide rotor angles to each of the processing cores 210, 212, 214. The chronometric period of the timer modules may be based on the chronometric period of the associated cores. For example, the chronometric period of the timer modules may be an average of the cores serviced or may be the same as the fastest core serviced. Core zero (0) 214 is configured to control current used by the electric machine. Core zero 214 also controls current for each of the actuators. Core two (2) is configured to control torque used by the electric machine using closed-loop torque control. Core one (1) is used to monitor Core zero and Core two by comparing rotor speed, position, or angle from the timer module 206 with the rotor speed, position, or angle from timer modules 206, 208 from Core zero 214 and Core two 210. Core zero and Core two store the rotor speed, position, or angle in separate logical memory locations (LMU) 216, 218. The monitor core one 212 may exchange shutdown commands with the main controls software application 220 to shut down the electric machine when Core zero 214 and Core two 210 fault.

Figure 3:
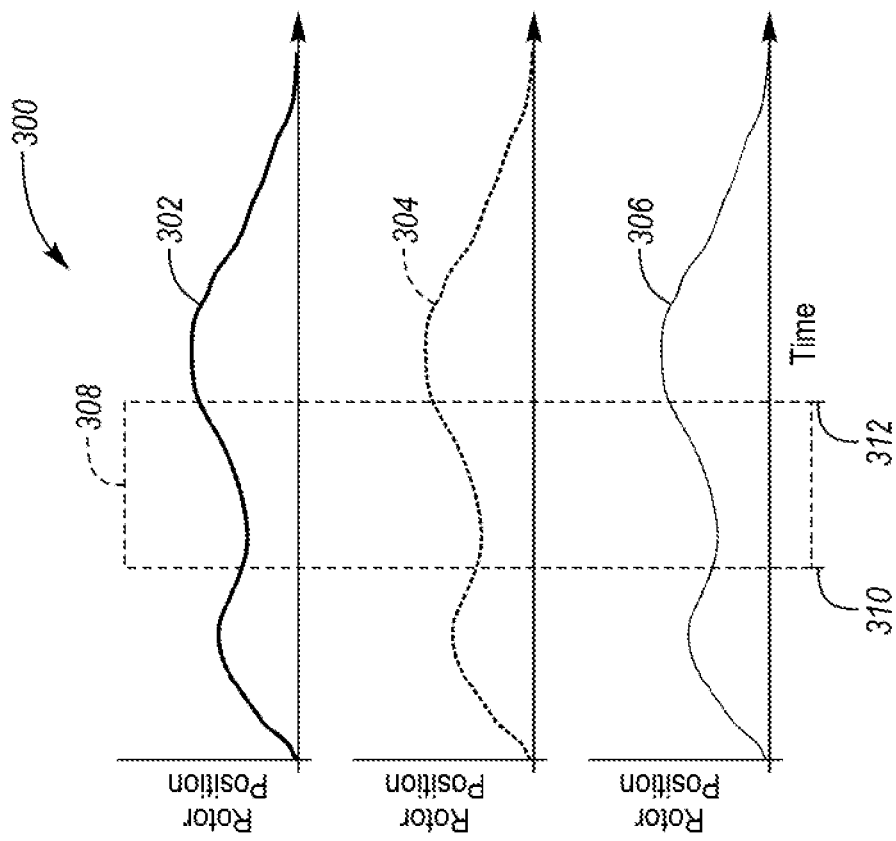
FIG. 3 is a graph including three sensor position indications and a common predetermined window.

Referring to FIG. 3, a graph 300 is shown. The graph 300 includes position indications 302, 304, 306 from each of the three cores. Graph 300 includes a predetermined window 308. The predetermined window begins at time 310 and ends at time 312. The rotor position, speed, or angle of the monitoring core 302 may be compared to the rotor, position, speed, or angle of the torque control core 304 or the current control core 306. The rotor positions 302, 304, 306 may be averaged over the window 308. A median of the rotor positions 302, 304, 306 may be taken over the predetermined window 308. Other various mathematical computations may be performed to achieve the same result. Because the chronometric period of the processors may be unequal, the cores 210, 212, 214 may store varying amounts of data in the LMUs 216, 218, which may require unnecessary memory occupation.

Figure 4:
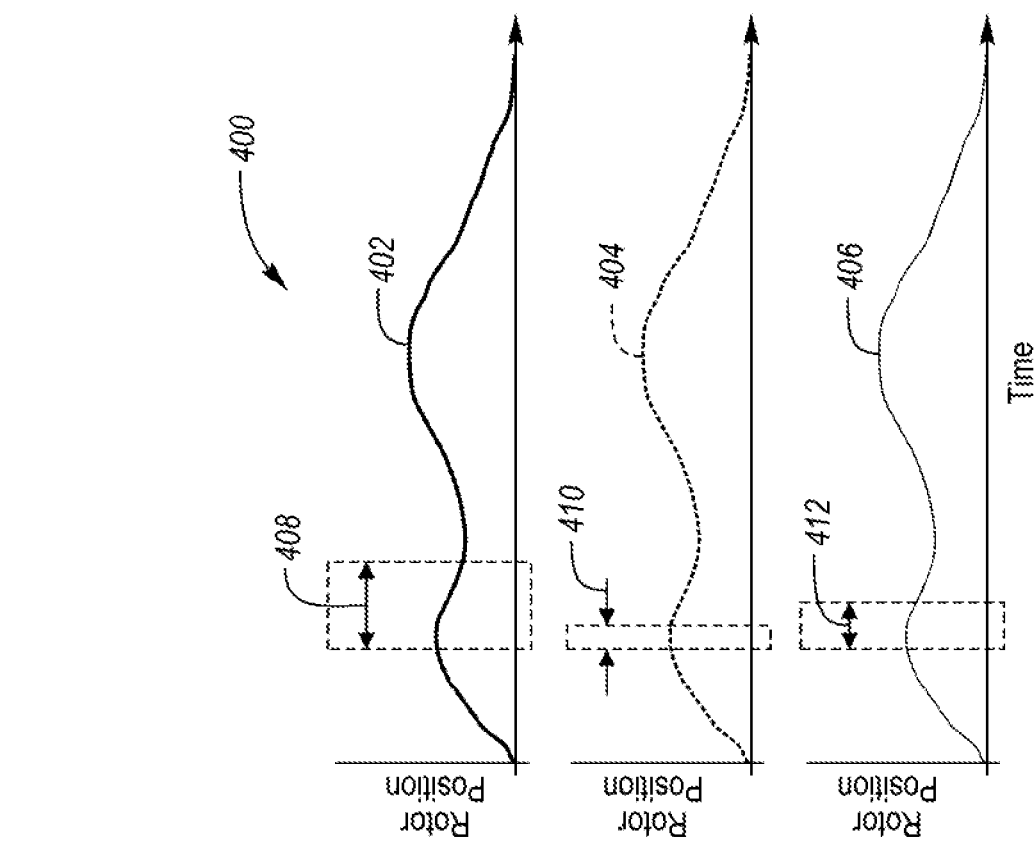
FIG. 4 is a graph including three sensor position indications and different predetermined windows.

Referring to FIG. 4, a graph 400 is shown. The graph 400 includes position indications 402, 404, 406 from each of the three cores. Graph 400 includes a predetermined window 408, 410, 412 for each of the rotor position curves 402, 404, 406, respectively. The window 408 for the monitoring core rotor position indication 402 may relate to a specific number of clock cycles to ensure a valid rotor position, speed, or angle is determined for comparison with the other rotor indications 404, 406. The window 408 may be the largest period due to the slowest respective clock speed of the monitoring core 212. The window 408 may be set as a baseline for the other windows 410, 412. The window 408 may be a function of the chronometric period of the monitoring core 212. For example, if the monitoring core 212 has a chronometric period of 10 ms, the window 408 may be 100 ms, corresponding to ten samples of the rotor position indication 402 of the monitoring core 212.

The window 410 may be a function of the chronometric period of the current core 214. For example, if the current control core 214 has a chronometric period of the window 410 may be 10 µs, corresponding to ten samples of the rotor position indication 404 of the current control core 214. The disparity between the windows 408, 410 may be reduced by ensuring a ratio is met. For example, the ratio between windows 408, 410 may be set to 1:100. For example, the windows may be equitably adjusted to ensure the ratio is satisfied. The 10 µs window, 410, may be increased to 50 µs and the 10 ms, 408, may be decreased to 5 ms.

The additional window 412 may be sized to proportionately meet the ratios as required. For example, the window 412 may correspond to a torque control core 210. The torque control core 210 may have a chronometric period of 1 ms. This means the ratio between each chronometric period is 1:1000:10,000. Ensuring that the windows 408, 410, 412 maintain a similar ratio, the window 412 for the torque control core 210 rotor position indication 406 may be set to 4.5 ms.

It can be appreciated that these values are examples only. The chronometric period of each of the processors may change depending on circumstantial inputs. The windows 402, 406, 408 may be dynamically adjusted to facilitate the same results.

Figure 5:
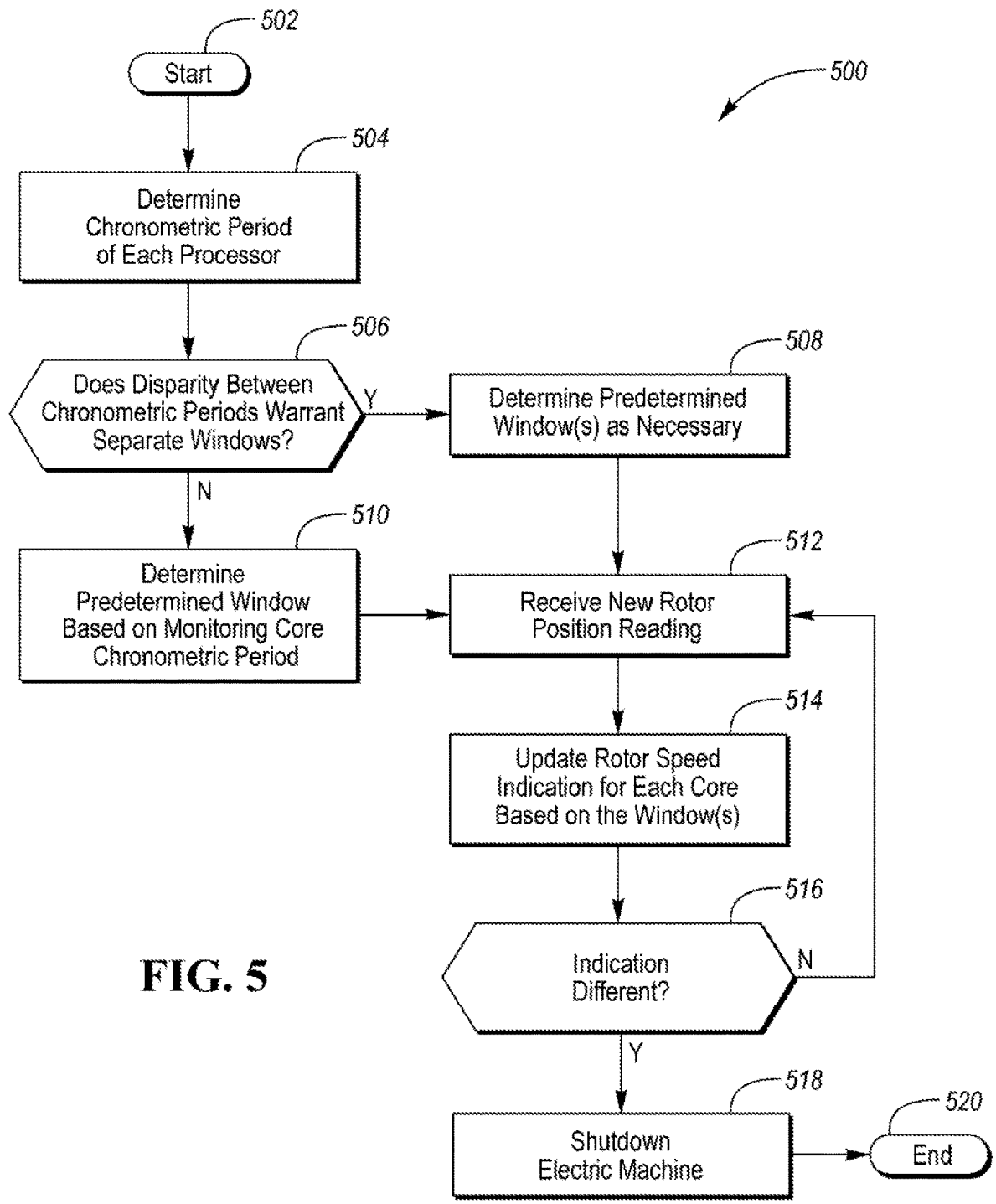
FIG. 5 is an algorithm for controlling an electric machine rotor.

Referring to FIG. 5, an algorithm 500 is shown. The algorithm 500 starts in step 502. In step 504, the controller may determine the chronometric period of each processor. The controller may then determine whether there is a disparity between the chronometric periods to warrant distinct windows. For example, if the chronometric periods are within 5% of one another, the controller may use the same windows, as shown in FIG. 3. In step 510, the controller determines a predetermined window to be used based on the chronometric period of the monitoring core 212. If the chronometric periods are outside of this band, the controller may adjust the windows to meet a predetermined ratio as discussed in FIG. 4 in step 508. The processing cores may receive a new rotor position reading in step 512 for each of the cores and save that to associated processor memory buffers. The average or median values may be calculated and shared via the LMU 216, 218. The monitoring core 212 may compare the shared indications to determine whether a deviation has occurred in step 516. The deviation may have a fault tolerance of ±5%. If a deviation has occurred, the controller may shutdown the electric machine in step 518. In step 520 the process ends.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   a traction battery;
   an electric machine powered by the traction battery via an inverter, the electric machine having a rotor;
   a sensor configured to provide a signal indicative of rotational position of the rotor;
   first and second timer modules each receiving sensor signals from the sensor, the first timer module having a first output signal with a first frequency lower than a second frequency of a second output signal from the second timer module; and
   a controller coupled to the electric machine, the sensor, and the first and second time modules, the controller including at least a first processing core, a second processing core, and a third processing core, the first processing core configured to determine a first rotor speed based on the first output signal, the second processing core configured to determine a second rotor speed based on the second output signal, the third processing core configured to determine a third rotor speed based on the first output signal and to control the inverter to control the electric machine in response to a difference between the first and second rotor speeds or a difference between the first and third rotor speeds exceeding a corresponding threshold.

2. The vehicle of claim 1 wherein the first processing core is configured to control torque of the electric machine based on at least one of the first, second, and third rotor speeds.

3. The vehicle of claim 2 wherein the second processing core is configured to control current supplied to the electric machine via the inverter based on at least one of the first, second, and third rotor speeds.

4. The vehicle of claim 1 wherein the first and second processing cores have different chronometric periods.

5. The vehicle of claim 4 wherein the chronometric period of the first processing core is an order of magnitude greater than the chronometric period of the second processing core.

6. The vehicle of claim 1 wherein the first, second, and third processing cores are configured to determine the first, second, and third rotor speeds based on an average of the associated first or second output signals over respective first, second, and third periods.

7. A method for controlling an electric machine of a vehicle, comprising:
   receiving rotor position signals from a sensor indicative of rotational position of a rotor of the electric machine;
   inputting the rotor position signals to a first timer module generating a first output signal having a first frequency and a second timer module generating a second output signal having a second frequency different from the first frequency;
   processing the first and second output signals by a controller having at least a first processing core, a second processing core, and a third processing core, wherein the first and second processing cores generate respective first and second rotor speeds based on the first output signal and the third processing core generates a third rotor speed based on the second output signal, wherein the controller controls an inverter coupled to the electric machine based on differences among the first, second, and third rotor speeds.

8. The method of claim 7 wherein the controller limits current to the inverter in response to a difference between any two of the first, second, and third rotor speeds exceeding a corresponding threshold.

9. The method of claim 7 wherein the processing by the first, second, and third processing cores corresponds to first, second, and third chronometric periods, and wherein at least two of the first, second, and third chronometric periods are different.

10. The method of claim 9 wherein at least one of the first, second, and third chronometric periods is an order of magnitude greater than another one of the first, second, and third chronometric periods.

11. The method of claim 9 wherein at least one of the first, second, and third chronometric periods is an integral multiple of another one of the first, second, and third chronometric periods.

\* \* \* \* \*